(12) United States Patent
Saito et al.

(10) Patent No.: US 8,584,040 B2
(45) Date of Patent: Nov. 12, 2013

(54) MOBILE TERMINAL

(75) Inventors: Akinori Saito, Okayama (JP); Kenichi Nakamura, Hino (JP); Masaki Sakai, Hino (JP); Akira Imai, Hino (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1021 days.

(21) Appl. No.: 11/974,244

(22) Filed: Oct. 12, 2007

(65) Prior Publication Data

US 2008/0092082 A1   Apr. 17, 2008

(30) Foreign Application Priority Data

Oct. 13, 2006 (JP) ................................ P2006-280617

(51) Int. Cl.
*G06F 3/048* (2013.01)
(52) U.S. Cl.
USPC ........................................ 715/810; 715/841
(58) Field of Classification Search
USPC ..................... 715/811, 810, 820, 841, 864
See application file for complete search history.

(56) References Cited

U.S. PATENT DOCUMENTS

| 5,115,501 | A | * | 5/1992 | Kerr ........................................ 1/1 |
| 5,327,529 | A | * | 7/1994 | Fults et al. ..................... 715/762 |
| 7,171,243 | B2 | * | 1/2007 | Watanabe et al. ............. 455/566 |
| 7,421,291 | B2 | * | 9/2008 | Karaoguz et al. ............. 455/574 |
| 7,492,350 | B2 | * | 2/2009 | Fabre et al. ..................... 345/156 |
| 2002/0113896 | A1 | * | 8/2002 | Takagi et al. ................. 348/569 |
| 2004/0268267 | A1 | * | 12/2004 | Moravcsik ..................... 715/821 |
| 2005/0097595 | A1 | * | 5/2005 | Lipsanen et al. ................ 725/25 |
| 2005/0114798 | A1 | * | 5/2005 | Jiang et al. ..................... 715/864 |

FOREIGN PATENT DOCUMENTS

| JP | 2003-058292 A | | 2/2003 |
| JP | 2003058292 A | * | 2/2003 |

\* cited by examiner

*Primary Examiner* — Omar Abdul-Ali
(74) *Attorney, Agent, or Firm* — Maschoff Brennan

(57) ABSTRACT

According to an aspect of the invention, there is provided a mobile terminal including: an application processor configured to execute application having first mode and second mode, wherein the first mode includes first number of menus and the second mode includes second number of menus smaller than that of the first mode; a mode selection unit configured to input mode switching instruction; and a transition control unit configured to switch one of the first and second modes to another mode within the same application if the mode selection unit is operated.

16 Claims, 10 Drawing Sheets

FIG. 6

CONTENT OF THE APPLICATION HISTORY INFORMATION MEMORY 11

| HISTORY ORDER COLUMN 11a | MODE TYPES 11B OF THE PRESENT APPLICATION 11b | FIGURES. |
|---|---|---|
| 1 | STANDBY APPLICATION (SIMPLE) | FIG. 3 (a) |
| 2 | MAIN MENU (SIMPLE) | FIG. 3 (b) |
| 3 | MAIN MENU (NORMAL) | FIG. 3 (e) |
| 4 | TOOL (NORMAL) | FIG. 3 (f) |
| 5 | NAVIGATION (NORMAL) | FIG. 3 (g) |
| 6 | MAIL RECEIVING APPLICATION (SIMPLE) | FIG. 4 (h) |
| 7 | MAIL RECEIVING TEXT DISPLAY APPLICATION (SIMPLE) | FIG. 4 (i) |
| 8 | | |

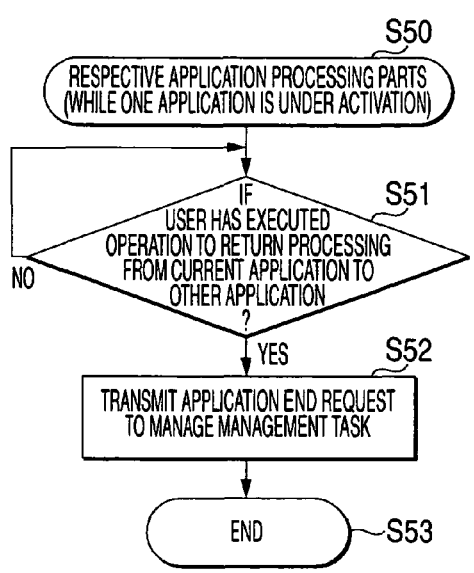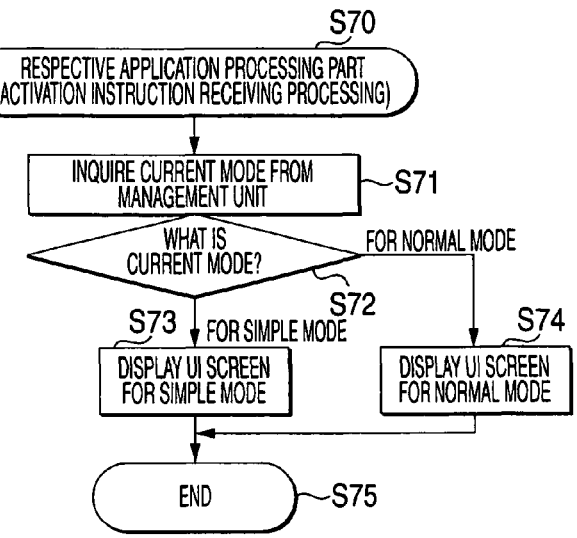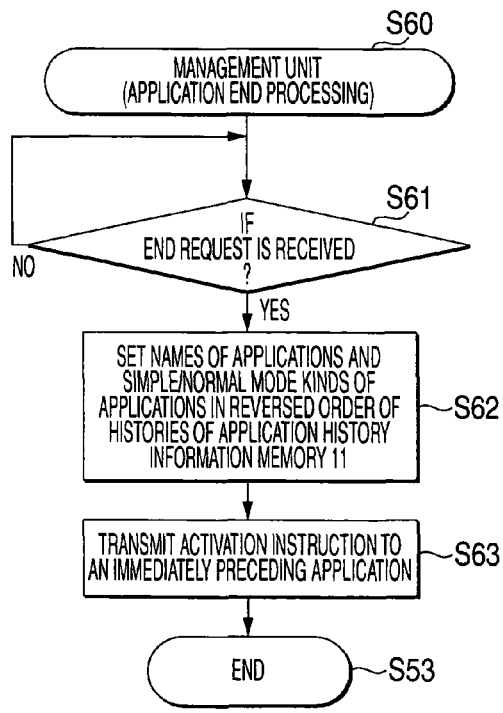

MOBILE TERMINAL

CROSS-REFERENCE TO RELATED APPLICATIONS

This application is based on and claims the benefit of priority from the prior Japanese Patent Application No. 2006-280617, filed on Oct. 13, 2006; the entire contents of which are incorporated herein by reference.

BACKGROUND

1. Technical Field

The present invention relates to a mobile terminal which has a simple mode for a user inexperienced in the operation thereof and a detailed normal mode for a user experienced in the operation thereof.

2. Description of the Related Art

There is known a mobile terminal which, being able to switch between a simple menu and a detailed menu, is easy to operate the menus and is thus easy to use for an old person or an inexperienced person (for example, see JP-A-2003-58292). In this mobile terminal, the simple menu (FIG. 2E accompanying JP-A-2003-58292) consists of the frequently-used functions of menu items contained in the detailed menu (FIG. 2B of JP-A-2003-58292), while excepting therefrom the functions that are not used frequently. The simple and detailed menus each has a three hierarchy structure which is composed of a large item, a middle item and a small item. When the inexperienced user uses only the simple menu, the mobile terminal is easy to operate.

SUMMARY

According to an aspect of the invention, there is provided a mobile terminal including: an application processor configured to execute application having first mode and second mode, wherein the first mode includes first number of menus and the second mode includes second number of menus smaller than that of the first mode; a mode selection unit configured to input mode switching instruction; and a transition control unit configured to switch one of the first and second modes to another mode within the same application if the mode selection unit is operated.

BRIEF DESCRIPTION OF THE DRAWINGS

In the accompanying drawings:

FIG. 6 is an explanatory view of the contents of an application history information memory 11 provided in a mobile terminal according to the embodiment;

FIGS. 10A, 10B, and 10C are exemplary flow charts of application ending operations to be executed in a mobile terminal according to the embodiment.

DESCRIPTION OF THE EMBODIMENTS

Figure 1:
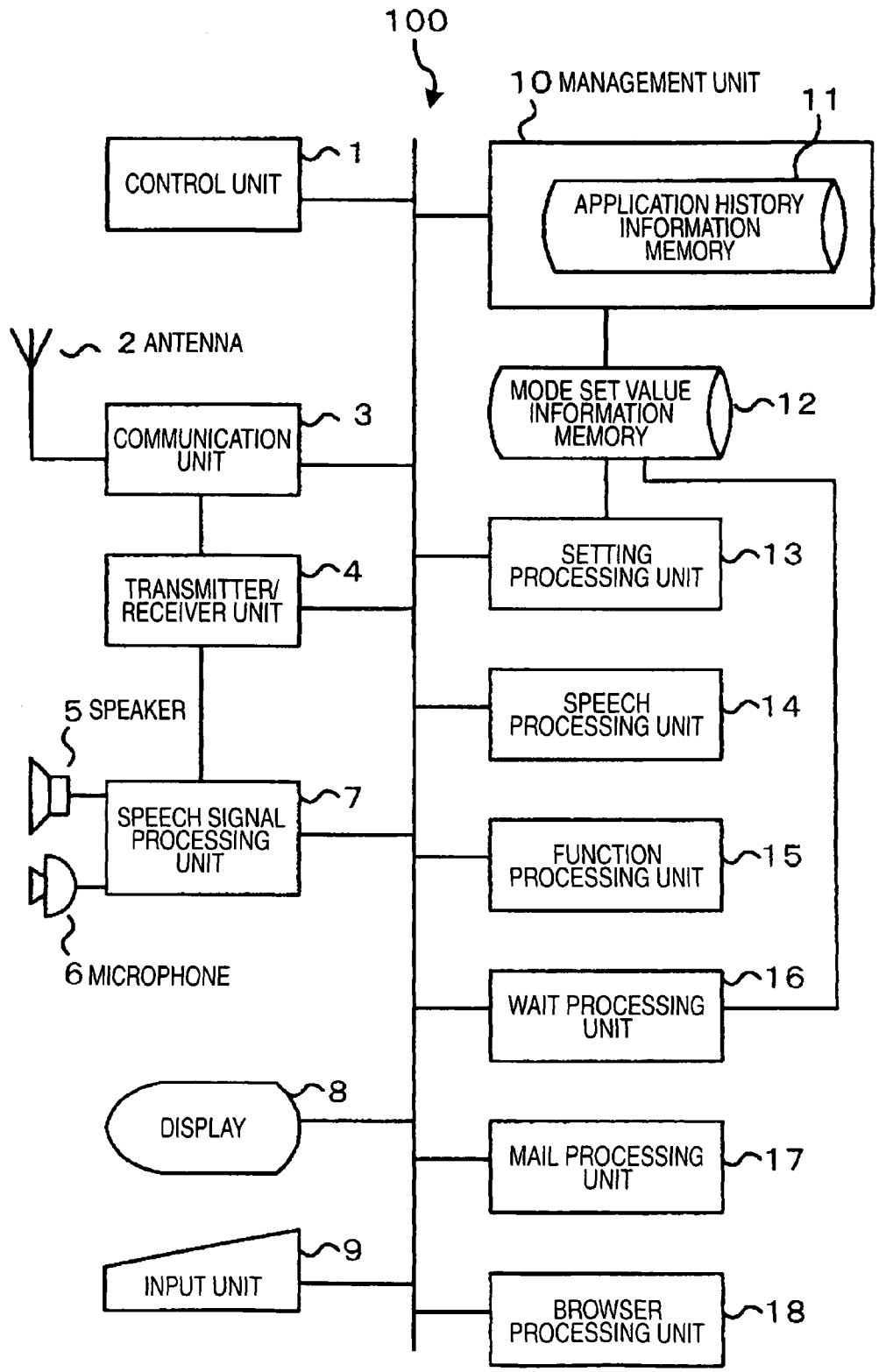
FIG. 1 is an exemplary block diagram of the respective units of a mobile terminal according to an embodiment of the invention.

FIG. 1 shows a mobile terminal 100 according to this invention and includes a control unit 1, an antenna 2, a communication unit 3, a transmitter/receiver 4, a speaker 5, a microphone 6, a speech signal processing unit 7, a display 8, an input unit 9, a management unit 10, an application history information memory 11, a mode information memory 12, a setting processing unit 13, a speech processing unit 14, a function processing unit 15, a wait processing unit 16, a mail processing unit 17, and a browser processing unit 18. The respective units carry out one or more application processings.

The control unit 1 controls the whole of the mobile terminal 100. The antenna 2 sends and receives radio signals to and from a base station (not shown) of a cellular system. The communication unit 3 sends a high frequency signal, which is received by the antenna 2, to the transmitter/receiver 4, and also sends a high frequency signal, which is to be sent from the transmitter/receiver 4, from the antenna 2. The transmitter/receiver 4 not only amplifies, frequency converts and demodulates the high frequency signal from the communication unit 3 and sends the thus obtained digital speech signal to the speech signal processing unit 7, but also sends a control signal to the control unit 1. Further, the transmitter/receiver 4 modulates, frequency converts and amplifies a digital speech signal to be sent from the speech signal processing unit 7 and a control signal to be sent from the control unit 1, obtains a high frequency signal, and sends the high frequency signal to the communication unit 3.

The speaker 5 is used to output a receiving speech and other sounds. The microphone 6 is used to input speech. The speech signal processing unit 7 converts a digital speech signal to be sent from the transmitter/receiver 4 to an analog speech signal, amplifies the analog speech signal and sends the amplified analog speech signal to the speaker 5. Also, the speech signal processing unit 7 amplifies an analog speech signal output from the microphone 6, converts the amplified analog speech signal to a digital speech signal, and then sends the digital speech signal to the transmitter/receiver 4. The display 8 is used to display various types of information and is composed of an LCD or the like. The input unit 9 is input means and consists of numeric keypad and function keypad.

The management unit 10 manages the operation modes of the application processings executed by the respective units, and stores the histories for each application executed into the application history information memory 11. Responding to the selection by the user, the mode information memory 12 stores, as a basic mode, one of a simple mode (a first mode) and a normal mode (a second mode) different from each other in display forms and operation manners thereof. The simplified mode is a mode suitable for a beginner or an old person.

The normal mode is a detailed mode suitable for a person of skill. The user selects one of these two modes. This selection is carried out by the setting processing unit 13 or by the wait processing unit 16.

Now, description regarding the respective processing units 13 to 18 will be given below. The setting processing unit 13 processes various settings which are set by a user. Especially, the setting processing unit 13 processes settings responding to the user's selection of one of the simple and normal modes in relation to the key operations and displays. The speech processing unit 14 executes the whole of the speech processing. The function processing unit 15 executes the whole of the functions that are equipped with by the mobile terminal 100, for example, an alarm function, a message recording function, a memo function, and a calculator function.

The wait processing unit 16 displays a standby screen on the display 8 when the mobile terminal is in the standby state. The mail processing unit 17 executes the whole of processings relating to the mail communication. The browser processing unit 18 executes the whole of processings relating to Web.

Figure 2:
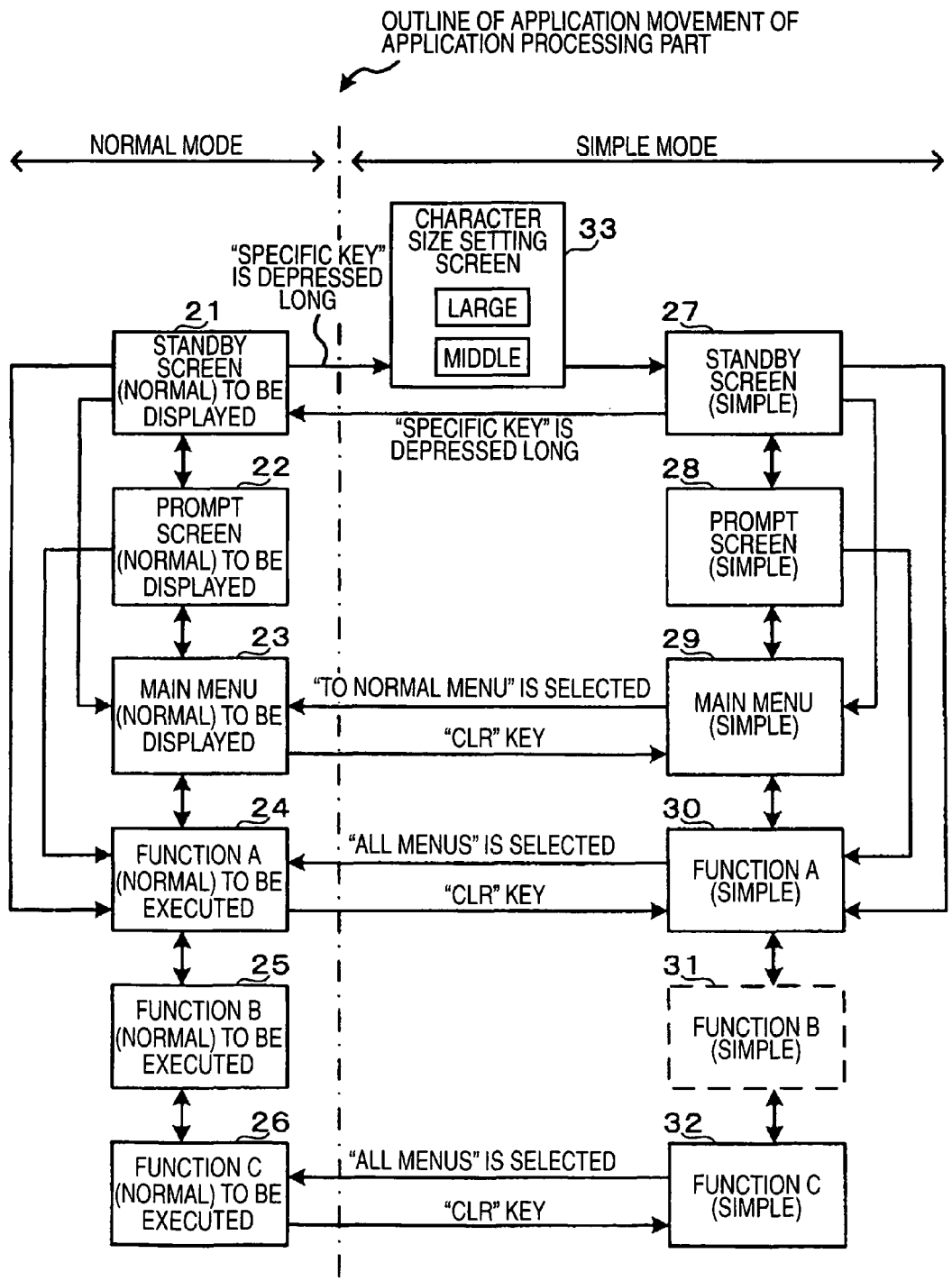
FIG. 2 is an explanatory view of the outline of the application movement of an application processing unit of a mobile terminal according to the embodiment.

FIG. 2 shows the processes of taking over a mode between applications and transition between the simple mode and the detailed mode in the same application. The left side of FIG. 2 with respect to a one-dot chained line shows the normal mode, whereas the right side thereof shows the simple mode.

In the normal mode, there are included a standby screen (for normal) 21 to be displayed, a prompt screen (for normal) 22 to be displayed, a main menu (for normal) 23 to be displayed, a function A (for normal) 24 to be executed, a function B (for normal) 25 to be executed, a function C (for normal) 26 to be executed, and the like. The respective functions have many items for a skilled person and the character size thereof is small. The simple mode includes a standby screen (for simple) 27 to be displayed, a prompt screen (for simple) 28 to be displayed, a main menu (for simple) 29 to be displayed, a function A (for simple) 30 to be executed, a function B (for normal) 31 to be executed, a function C (for simple) 32 to be executed, and the like, and their contents are simple in functions and menu structure of the normal mode. In the simple mode, the user can select, as a character size, a large size or a middle size.

By the way, referring to the function B 25, the contents thereof are originally simple and thus it is not necessary to provide a function for a simple mode. Specifically, the function B 25, as it is, can also be used in the simple mode, that is, it is used as the function B 31 for the simple mode.

When the mobile terminal 100 is turned on, as a default, the mobile terminal 100 sets the normal mode for the skilled person, then the standby screen 21 is displayed on the display 8. In this state, when a user operates any keys other than a specific key, according to the key operation, the application transition is carried out among the standby screen 21, the prompt screen 22, the main menu 23, the function A 24, the function B 25, the function C 26, as shown in the left side of the one-dot chained line in FIG. 2. The skilled person can easily operate the mobile terminal 100 using the operations and displays in this normal mode.

When a user is a beginner or an old person and the user thinks it difficult to operate the mobile terminal 100 in the normal mode, the user may press and hold the specific key. Then, the normal mode is switched to the simple mode suitable for the beginner or the old person and, firstly, a character size setting screen 33 is displayed on the display 8. Further, when the user selects one of large and middle, the standby screen 27 is displayed on the display 8. The displayed character size sets large or middle according to the selection in the character size setting screen 33. While the standby screen 27 is displayed on the display 8, when the user presses and holds the specific key, the state of the standby screen 27 is switched to the normal mode for the skilled person.

In the simple mode, when the user operates any keys other than the specific key, according to the operation, operations and displays transit among the standby screen 27, the prompt screen 28, the main menu 29, the function A 30, the function B 31, and the function C 32, as shown in the right side of the one-dot chained line in FIG. 2. Thus, the beginner or the old person can easily operate the mobile terminal 100 using the operations and displays in the simple mode. However, sometimes, the beginner or the old person wants to use one or more of the functions assigned to the normal mode that are not contained in the simple mode.

For example, when the user wants to use one or more of the detailed items that are not contained in the main menu 29, the user may select normal mode item on the mail menu screen 29, then the main menu 23 corresponding to the main menu 29 is displayed on the display 8, whereby the user is allowed to use the main menu 23. And, when the user finishes using the detailed items in the main menu 23 and manipulates a CLR (clear) key to be used as a return key, the main menu 23 is returned back to the main menu 29. That is, for every application, the simple mode can be moved to the normal mode directly and temporarily.

Figure 3:
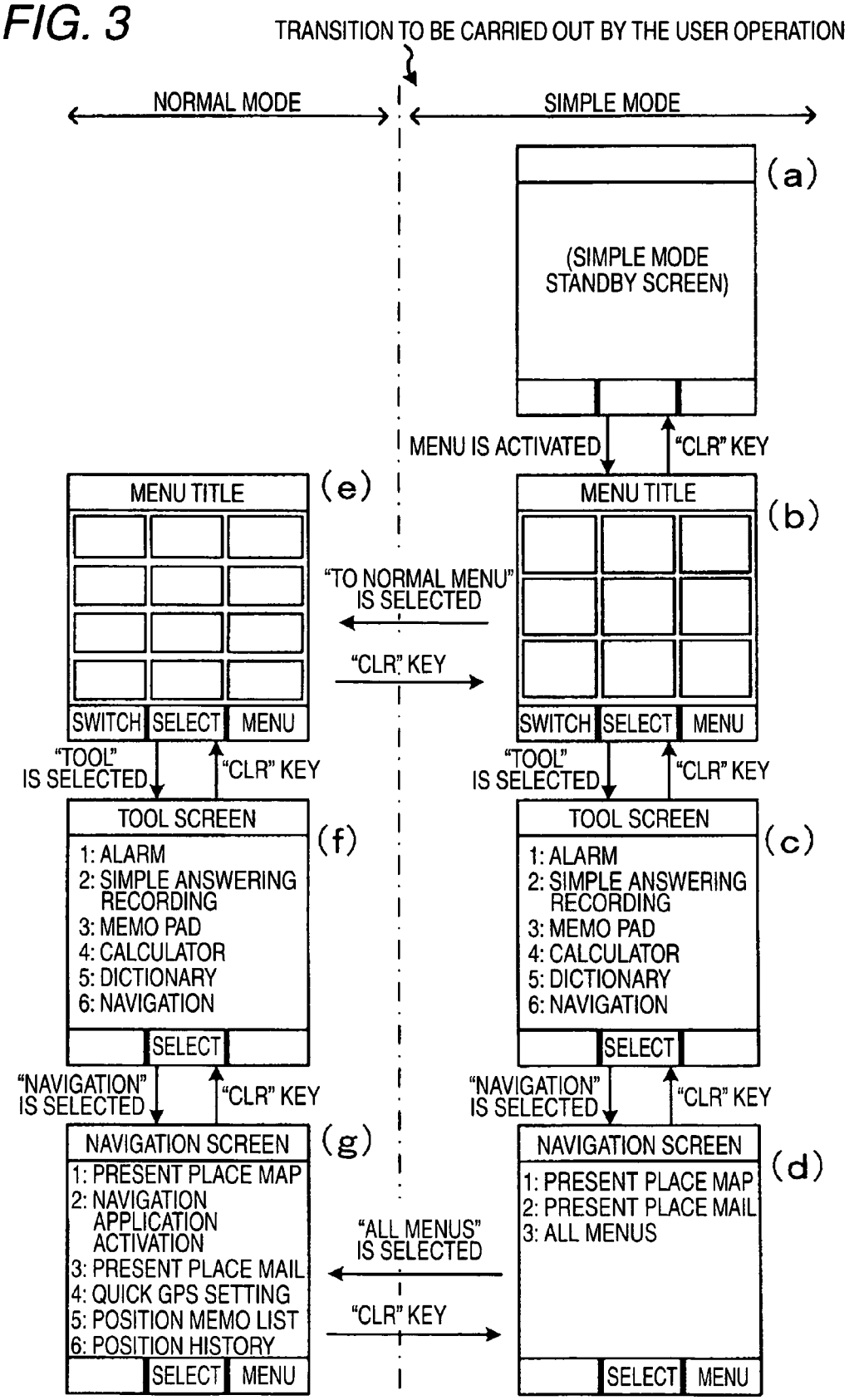
FIG. 3 is an explanatory view of the detail 1 of the application movement of an application processing unit of a mobile terminal according to the embodiment.

FIG. 3 shows first embodiment regarding the processes of taking over a mode between applications and the transition between the simple mode and the detailed mode in the same application. In this case, it is assumed that the simple mode, which is suitable for the beginner or the aged person, is set as a basic mode. There are four types of applications for displaying and managing a standby screen, a menu, a tool, and navigation respectively. For the respective applications regarding the menu, the tool, and the navigation, there is provided a simple mode and a normal mode. According to the user operations shown by arrow marks in FIG. 3, the applications can be transited in the arrow marks.

The transition from the simplified mode to the normal mode in the same application is carried out by manipulating the specific key having a function to switch the mode between the simple mode and the normal mode. The specific key may be a softkey and its function is indicated by displaying the function such as "to the normal menu", "all menus", "all sub-menus" and "all items" keys. For other key operations, the transition is carried out in such a manner that the currently displayed simple or normal mode will be continued. As the examples of the transition of the applications, the transition to be carried out in the order of (a), (b), (e), (f), and (g) will be described.

When a menu display operation is inputted while the standby screen of the simple mode is displayed ((a) of FIG. 3), while the simple mode is being continued, the standby screen (a) is moved to the main menu screen of the simple mode ((b) of FIG. 3). Items included in the main menu screen (b) are expressed in nine square frames respectively. In the central frame, there is displayed a "normal menu" item. When the item, which the user wants to use, is not found in other eight items, the user may select the "normal menu" item. As a result of this, the main menu screen (b) of the simple mode is moved to the main menu screen of the normal mode ((e) of FIG. 3).

Items included on the screen of the main menu screen (e) are expressed in twelve square frames respectively; and, in the main menu screen (e), there are included the detailed items that are not included in the main menu screen (b). When the "tool" item is selected in the main menu screen (e), while the normal mode is being continued, the main menu screen (e)

is moved to the tool screen of the normal mode ((f) of FIG. 3). In the tool screen (f), when the "navigation" item is selected, while the normal mode is being continued, the tool screen (f) is moved to the navigation screen ((g) of FIG. 3).

When the user wants to change the normal mode to the simple mode, the user may depress the CLR key (return key). As a result of this, the normal mode can be returned to the simple mode. Also, although not shown in FIG. 3, in every state, when the user depresses an "END" key (power key), the state is directly returned to the standby screen (a).

In this manner, while the simple mode set as the basic mode is transited as it is, according to the user's operation, the applications can be moved between the simple and normal modes easily and temporarily.

Figure 4:
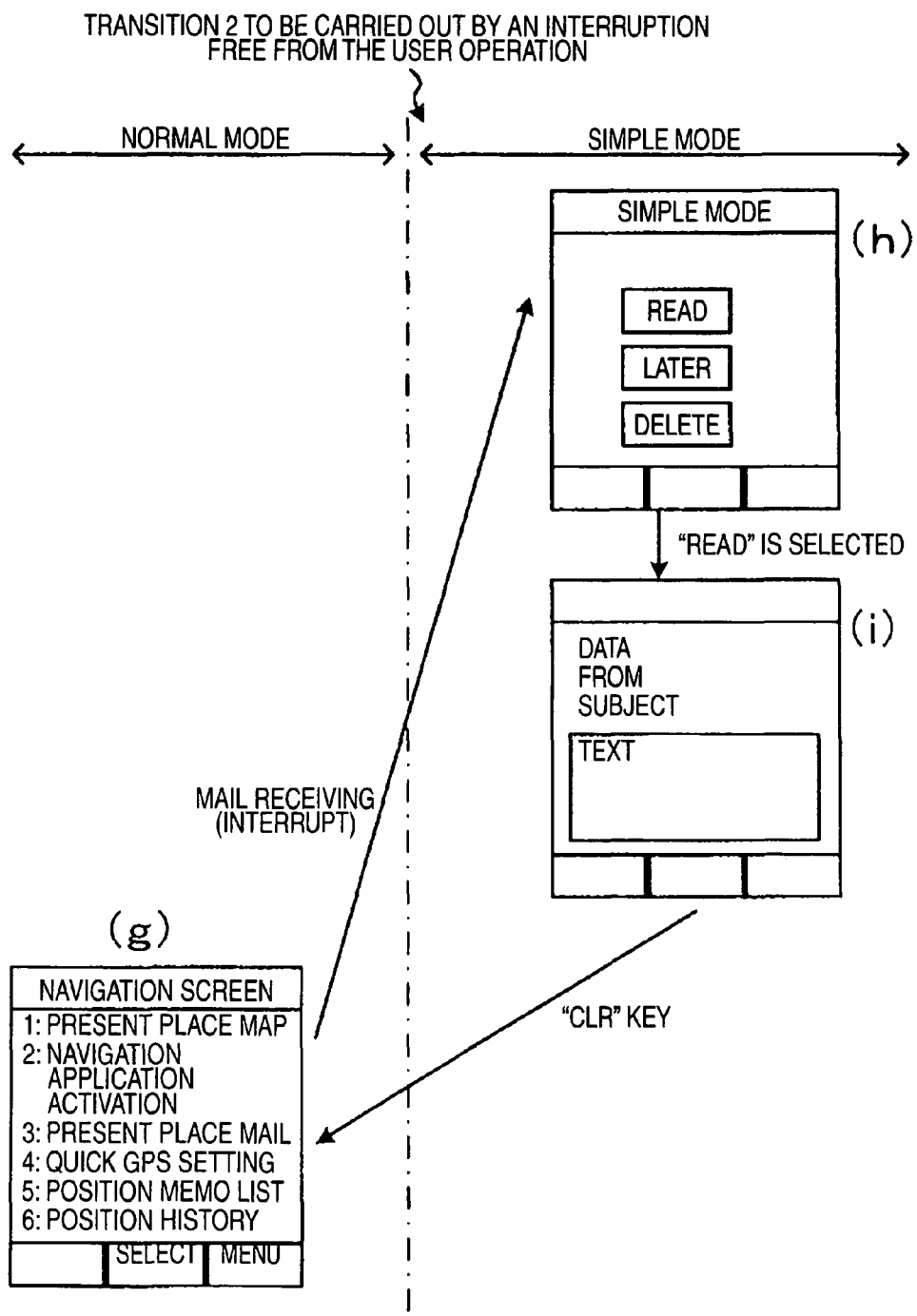
FIG. 4 is an explanatory view of the detail 2 of the application movement of an application processing unit of a mobile terminal according to the embodiment.

FIG. 3 shows the transition to be carried out by the user operation, whereas FIG. 4 shows second embodiment regarding the transition to be carried out by an interruption free from the user operation. As interruptions not intended by a user, for example, there are present mail receiving, incoming call, TV phone incoming call, PTT (Push to Talk) request and an alarm. In the second embodiment, it is supposed that, in the state of the navigation screen (g) is displayed by the navigation application on the display 8 as shown in FIG. 3, a mail is received from the base station.

When a mail is received, the normal mode is terminated and the simple mode set as a basic mode is restored, then mail screen is displayed on the display 8 ((h) of FIG. 4). In the mail screen (h), there are 3 items of open request, skip request, and delete request. When the open request item is selected in the main screen (h), the simple mode is continued and a mail body is displayed on the display 8 ((i) of FIG. 4). When the user reads through the mail and depresses a CLR key, the mode is switched from simple mode to the simple mode and navigation screen (g), which is the state when the interrupt (mail receiving) was made, is restored. In this state, the user is allowed to execute a processing in the navigation application again.

In this manner, when an interrupt not intended by the user occurs, by changing the mode to the simple mode that is set as the basic mode, the user is allowed to operate the mobile terminal in the simple mode that is originally set by the user.

Figure 5:
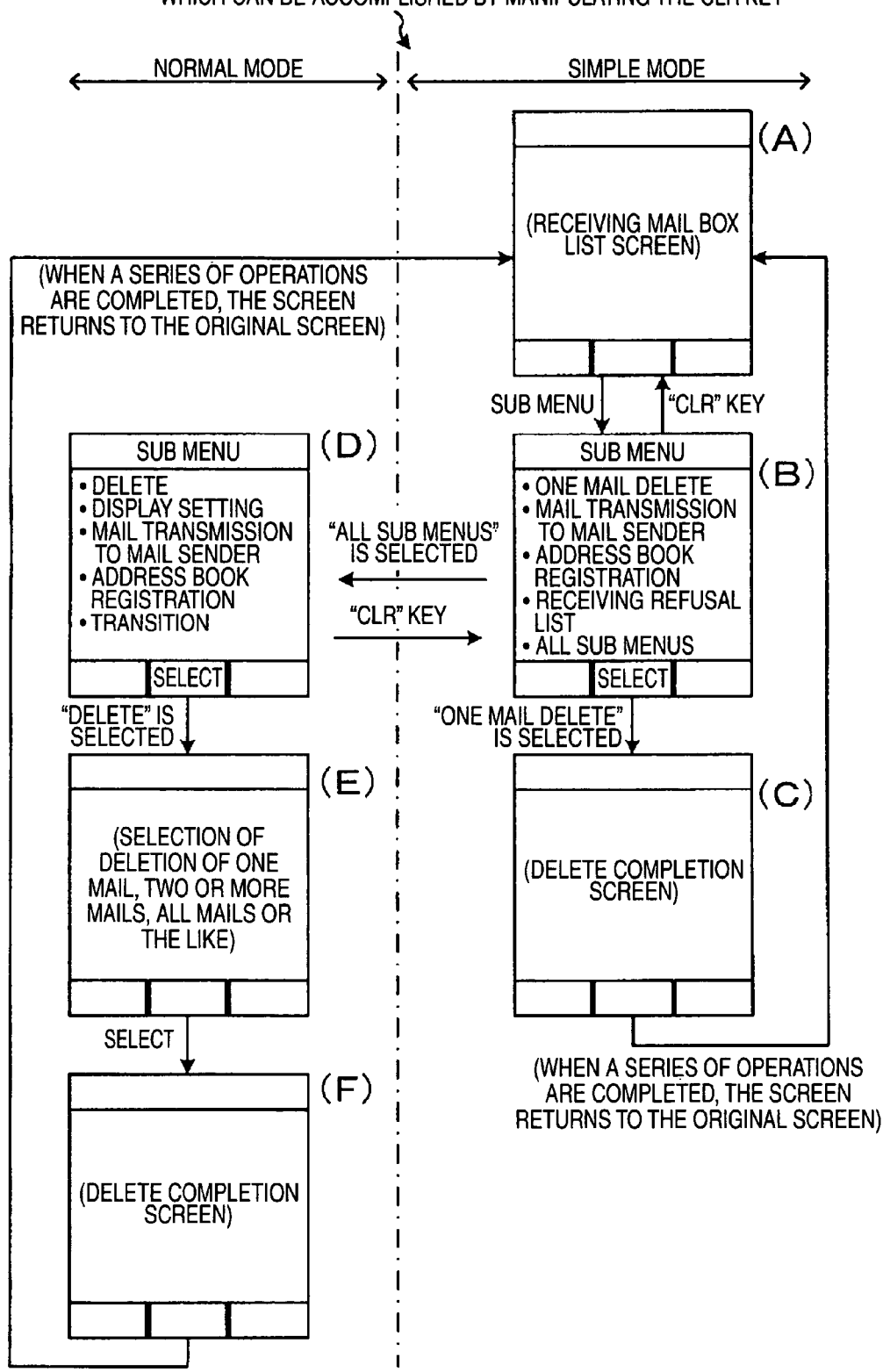
FIG. 5 is an explanatory view of the detail 3 of the application movement of an application processing unit of a mobile terminal according to the embodiment.

FIG. 5 shows third embodiment regarding the transition to be carried out without return operation which can be accomplished by manipulating the CLR key. In this example, a received mail box screen, a sub-menu screen, and a delete completion screen are displayed in order by the mail application. In the received mail box screen (A) of the simple mode, when a cursor is set to one received mail and the "sub-menu" operation is carried out, the screen is moved to a sub menu screen (B) of the simple mode.

In the sub menu screen (B), a "one-mail delete" operation is executed, a processing for deleting a specified mail is carried out and the screen is moved to a delete completion screen (C), where a delete completion screen is displayed for a given period. And, as it is, the screen is returned to the received mail box screen (A) of the simple mode that has been set as the basic mode.

In the sub menu screen (B), when an "all sub menus" item is selected, the screen is changed to the sub menu screen (D) of the normal mode. In the sub menu screen (D), a "delete" item is selected, the screen is changed to a delete selection screen (E). In the delete selection screen (E), when any one of "one mail" item, "more than one mail" item, and "all mails" item is selected, the selected delete processing is carried out and the screen is changed to a delete completion screen (F), where the delete completion screen is displayed for a given period. And, as it is, the screen is returned to the received mail box screen (A) of the simple mode that has been set as the basic mode.

In this manner, the basic mode is restored after a series of operations are completed in one of the simple mode and normal (detailed) mode, even if the user switches one mode to another which is not the basic mode. Consequently, the screen which is convenient for a user can be displayed on the display 8 smoothly. The same process as described above can be executed after one of editing operation of an address book, registration operation of book marks in a browser, transfer operation of mails, an editor operation, delete operation of a data folder, and the like is completed.

FIG. 6 shows an example of content of the application history information memory 11. There is shown the case that has been discussed with reference to FIGS. 3 and 4, in which the order of the transition is (a), (b), (e), (f), (g), (h) and (i). The management unit 10 records, in the application history information memory 11, the names of applications and the mode types 11b of the present applications that respectively correspond to numbers included in a history order column 11a.

In the number 1 of the history order column 11a, there is recorded the standby application that corresponds to the simple mode and is displayed first. In the history order number 2, there is recorded a main menu application which corresponds to the simple mode and is moved by the then next selection and operation. Similarly, in the history order number 3, there is recorded a main menu application corresponding to the normal mode; in the history order number 4, there is recorded a tool application corresponding to the normal mode; in the history order number 5, there is recorded a navigation application corresponding to the normal mode: in the history order number 6, there is recorded a mail receiving application corresponding to the simple mode; and, in the history order number 7, there is recorded a main receiving text display application corresponding to the simple mode.

Figure 7:
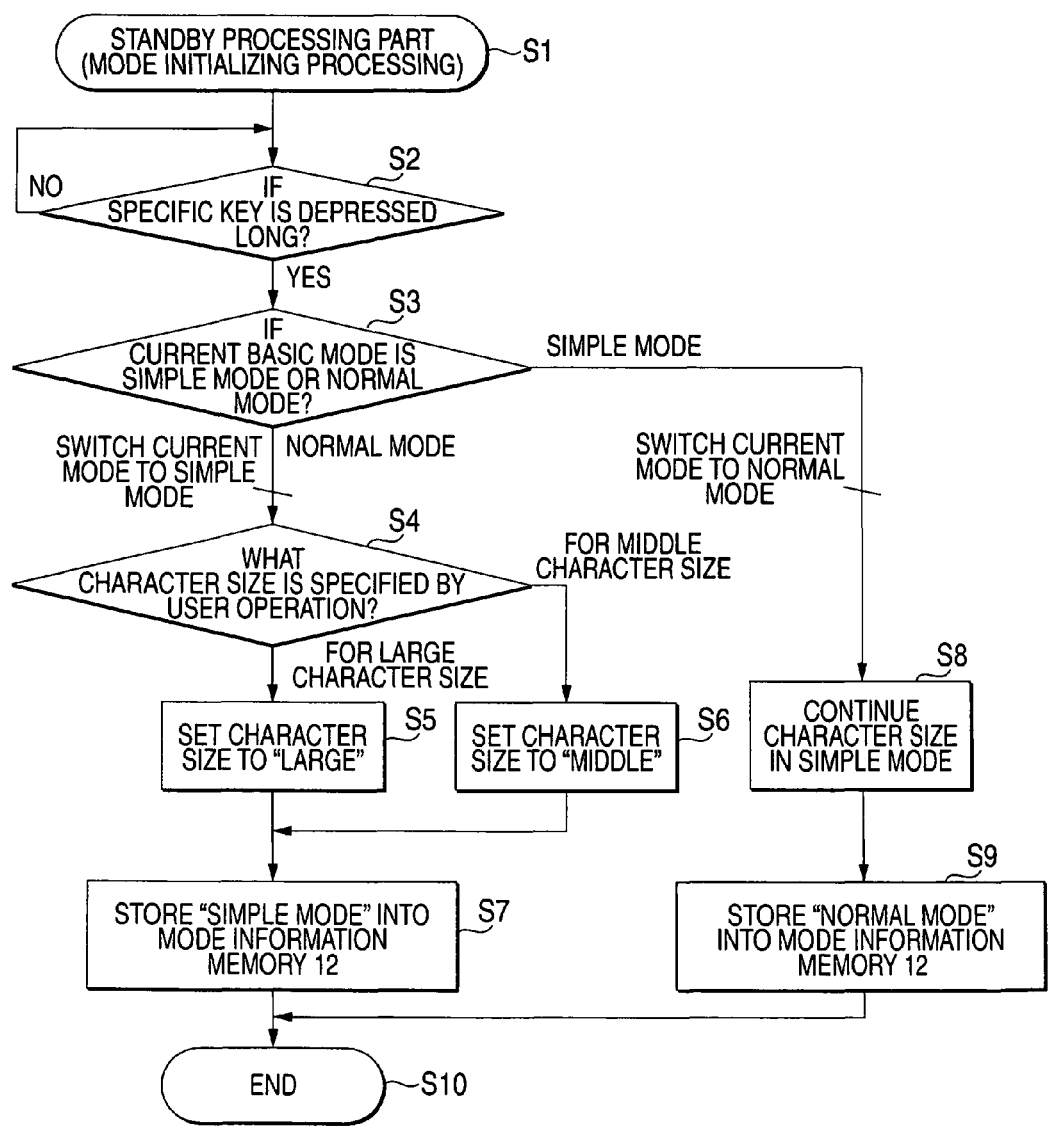
FIG. 7 is a flow chart of an operation for a user to set a basic mode in connection with simple and normal modes in a wait processing part 16 provided in a mobile terminal according to the embodiment.

Referring to FIG. 7, when the specific key is pressed and held (in Step S2, YES), the current basic mode is confirmed (Step S3). If it is found as the normal mode, the basic setting is switched over to the simple mode, which is opposite to the normal mode, in the following manner. Firstly, a user operation relating to the size of characters is checked (Step S4). If the character size is found as "large", the character size is set to "large" (Step S5) For a "middle" size, the character size is set to "middle" (Step S6). And, the "simple mode" is stored into the mode information memory 12 (Step S7).

When the current basic mode is found as the simple mode in Step S3, the basic mode is changed to the normal mode opposite to the simple mode in the following manner. Firstly, as regards the character size, the character size set in the simple mode is continued (Step SB). Although not shown in FIG. 7, in the initial normal mode state, the character size can be selected from "large size", "middle size" and "small size". And, the "normal mode" is stored in the mode information memory 12 (Step S9). This ends the basic mode setting processing (Step S10). By the way, the processing shown in FIG. 7 is carried out similarly by the setting processing part 13 as well.

Next, with reference to FIGS. 8A, 8B, and 9, description will be given below of the transition of the applications executed in respective processing units described by using FIGS. 3, 4, and 5, and management unit 10.

The above operations will be described below with reference to FIGS. 8A, 8B and 9.

Figure 8A:
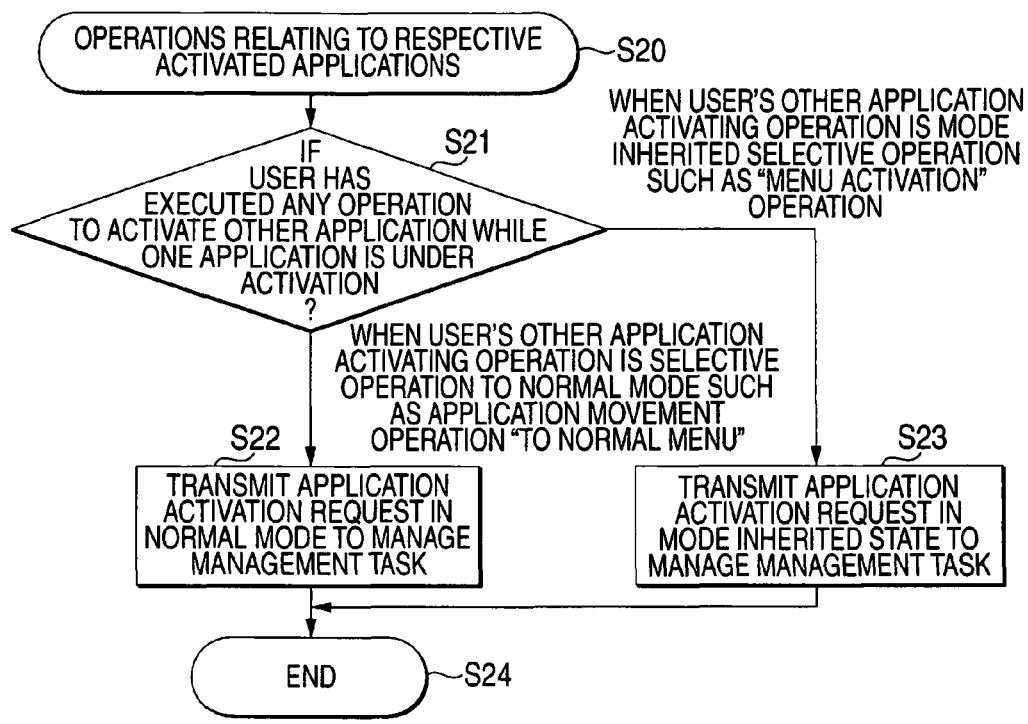
FIGS. 8A and 8B are exemplary flow charts of an operation relating to the activation of the respective application processing units provided in a mobile terminal according to the embodiment.

FIG. 8A is a flow chart showing operations relating to respective activated applications. When, during the activation, an operation to activate other application by a user is executed, the type of the operation is checked (Step S21). When the type is the selective operation of "to normal menu", "all menus", "all sub menu" or "all items", for example, when it is the "to normal menu" moving operation from FIG. 3(b) to 3(e), an application activation request is transmitted to the management task in the normal mode (Step S22). When, in Step S21, the type is other selective operation than the above operation, for example, a selective operation for the "menu activation" from FIG. 3 (a) to 3 (b), an application activation request is transmitted to the management task in the normal mode while the mode is inherited (Step S23).

In correspondence to these operations of the respective applications, the management unit 10 operates in the following manner.

Figure 9:
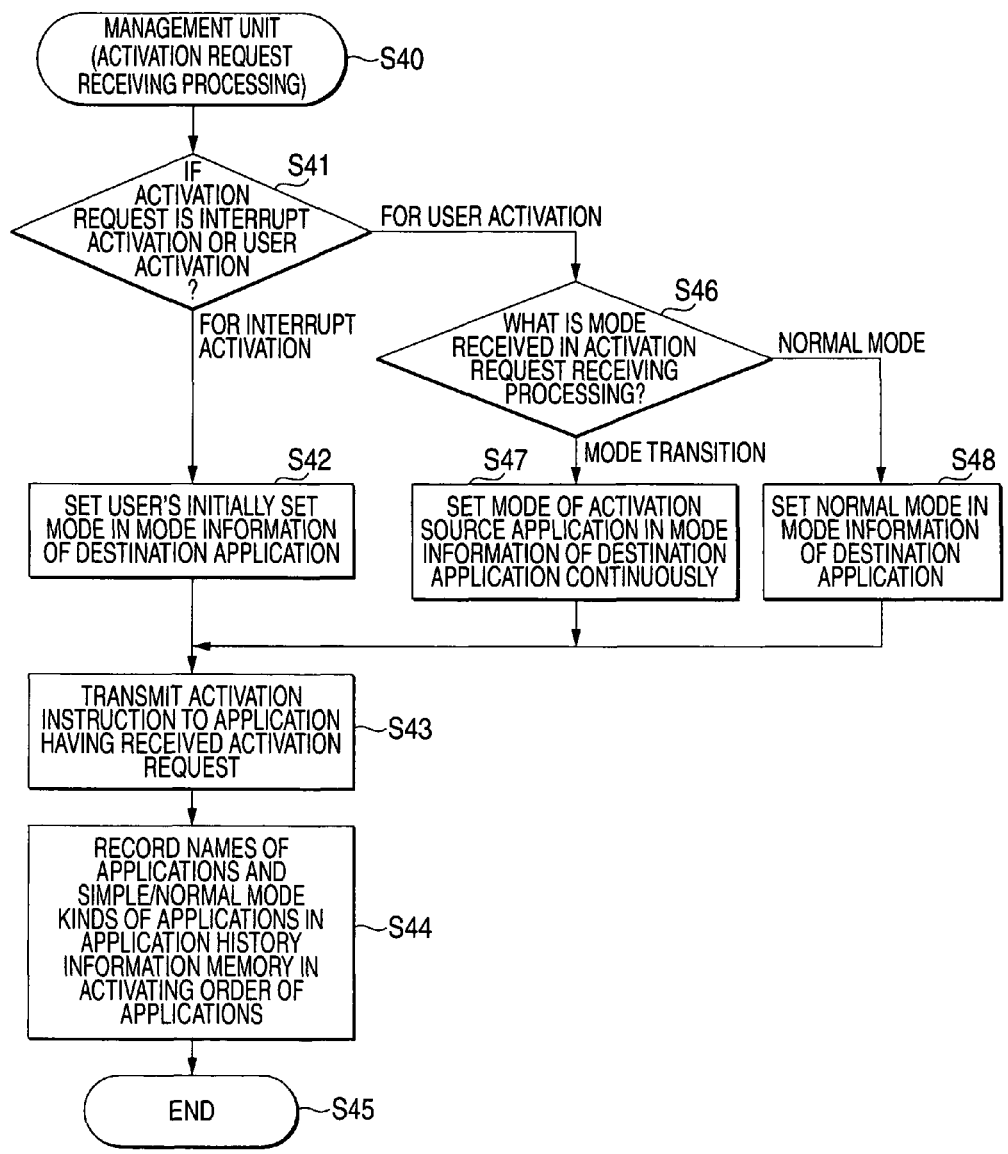
FIG. 9 is an exemplary flow chart of an operation relating to the activation of a manage part provided in a mobile terminal according to the embodiment.

In FIG. 9, when the management unit 10 receives the activation request from the respective application processing units, it starts the activation request receiving processing (Step S40). This corresponds to the movement conditions shown by the arrow marks in FIGS. 3, 4 and 5, for example, the "to normal menu" from FIG. 3 (b) to 3 (e), and "mail receiving" from FIG. 4 (g) to 4 (h).

Then, it is checked whether the type of the activation request is an interrupt activation request or a user activation interrupt (Step S41). The interrupt activation includes mail receiving, sound receiving, TV phone receiving, PTT (Push To Talk) receiving, an alarm, and the like. In the application to be operated by the interrupt activation, an interrupt activation request is transmitted (not shown).

For the interrupt activation in Step S41, the basic mode set by the user, that is, the content of the mode information memory 12 (FIG. 1) is set in the mode information of the destination application (Step S42), and an activation instruction is transmitted to the application which has received the activation request (Step S43). As a result of this, for example, the mail receiving application shown in FIG. 4 (h) is activated in the simple mode. And, in activating order of the applications, the names of the applications and the type of the simple and normal modes of these applications are recorded in the application history information memory 11 (Step S44), thereby ending the activation request receiving processing (Step S45).

For the user activation (other than the interrupt activation) in Step S41, the mode received in the application activation request is checked (Step S46). When it is the activation request with the mode being inherited, the mode of the activation-source application is inherited and set in the mode information of the destination application (Step S47), and an activation instruction is transmitted to the application that has received the activation request (Step S43). As a result of this, for example, when the "menu activation" operation is carried out in the simple mode state shown in FIG. 3 (a), the simple mode is inherited and the main menu application shown in FIG. 3 (b) is activated in the simple mode. Also, when the "tool" selective operation is carried out in the normal mode state shown in FIG. 3 (e), the normal mode is inherited and the application shown in FIG. 3 (f) is activated in the normal mode.

For the activation request in the normal mode in Step S46, the normal mode is set in the mode information of the destination application (Step S48) and an activation instruction is transmitted to the application that has received the activation request (S43). As a result of this, when the "to normal menu" is selected and operated in the simple mode state shown in FIG. 3 (b), the main menu application shown in FIG. 3 (e) is activated in the normal mode.

In correspondence to these operations of the manage part, the respective application processing units operate in the following manner.

Figure 8B:
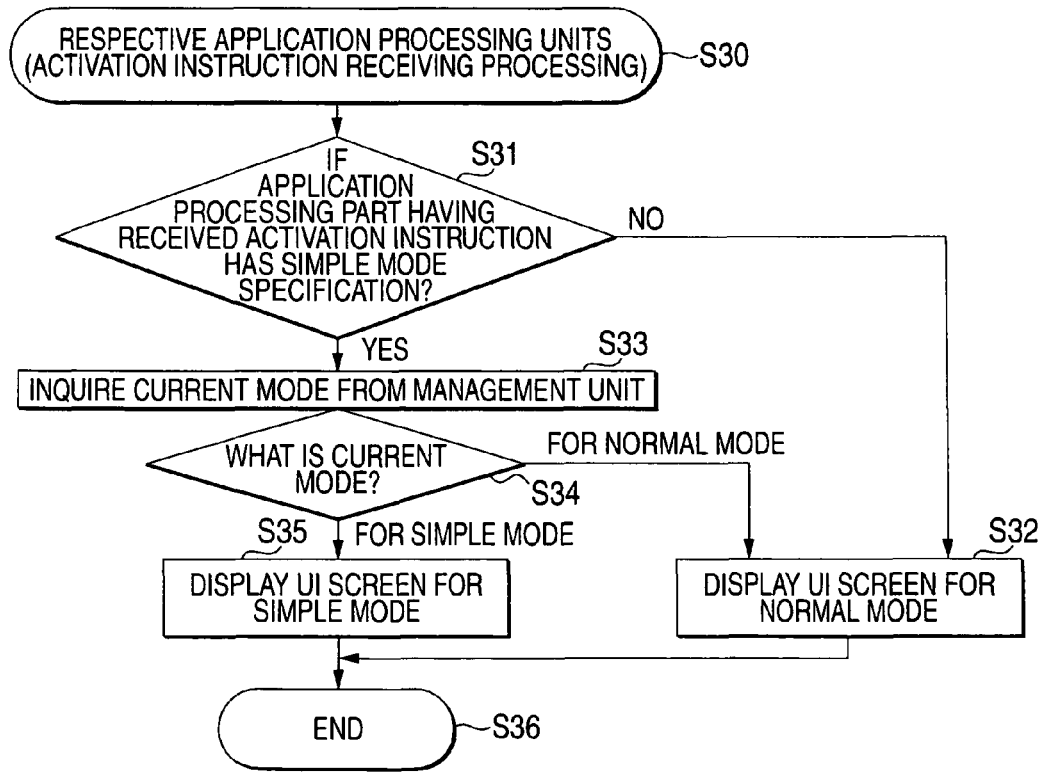

FIG. 8B is a flow chart of an operation relating to the activation instruction receiving operations in the respective application processing units. On receiving an activation instruction from the management unit 10 (Step S30), the application processing unit firstly checks whether a function corresponding to a simple mode is provided or not (Step S31). The reason for this is that, like the normal function B that has been described in FIG. 2, in the case of a function for an item which is originally simple, there exists an application that has only the normal mode while it does not dare to have a simple mode. When the function corresponding to the simple mode is not provided, there is displayed a UI (user interface) screen for the normal mode (Step S32).

In Step S31, when the function corresponding to the simple mode is provided, the application processing unit inquires the current mode from the management unit 10 (Steps S33 and S34). In the management unit 10, there is set the normal mode that is judged in Step 46 shown in FIG. 9, or a mode-inherited simple or normal mode. The respective application processing unit checks this (Steps S33 and S34). For the simple mode, there is displayed a UI screen for a simple mode (Step S35). In response to this, for example, the main menu application shown in FIG. 3 (b) is activated in the simple mode. Also, for the normal mode, there is displayed a UI screen for a normal mode (Step S32). In response to this, for example, the main menu application shown in FIG. 3 (e) is activated in the normal mode.

FIG. 10A is a flow chart of an operation to be executed while the respective applications are activated. During the activation, a user's operation to return an application to other application is checked. The return operation corresponds to return movement conditions shown by arrow marks in FIGS. 3, 4 and 5, for example, the operation of the "CLR" key shown in FIG. 3, the operation of the "CLR" key shown in FIG. 4, and the operation of the "completion of a series of operations" shown in FIG. 5.

When the return operation is executed, an application end request is transmitted to the management task (Step S52), thereby ending the current processing (Step S53).

FIG. 10B is a flow chart of an operation relating to the application ending processing to be executed in the management unit 10. On receiving an application end request from the respective application processing units (in Step S61, YES), the management unit 10 sets an immediately preceding application and the type of simple or normal mode thereof in the reversed order of the history of the applications stored in the application history information memory 11 shown in FIG. 6. And, from the current application histories, there is deleted one of them (Step S62). Then, an activation instruction is transmitted to an immediately preceding application (Step S63).

However, when the application end request from the respective application processing units is the "completion of a series of operations" shown in FIG. 5, the activation instruction is transmitted not to the immediately preceding application in the application history information memory 11 but to a previously determined application several in front. Also, when the application is returned from the application (i) shown in FIG. 4 to the application (g) with the "CLR" key, the application (g) that was open when interrupted has been previously stored, and the application (i) is returned to the previously stored application (g).

FIG. 10C is a flow chart of the operation of each of the application processing units when it receives an activation instruction. On receiving an activation instruction, the application processing unit inquires the current mode from the manage part 10 (Steps S71 and 72). When the current mode is a simple mode, there is displayed a UI screen for a simple mode (Step S73). For a normal mode, there is displayed a UI screen for a normal mode (Step S74). According to the processings shown in FIGS. 10A, 10B, and 10C, the application return movements in the application processing units described in FIGS. 3, 4 and 5 are carried out.

According to the above-mentioned embodiment, when the respective applications are activated, the applications can inherit the mode information unconsciously. In the case of an application in which the display and operation thereof are not changed even when the mode thereof is changed, the application can be mounted without paying attention to the mode. Even when the function of the normal mode is used temporarily during the simple mode, an interrupt application can be activated in the simple mode.

This processing makes it possible to execute the inter-mode movement between the simple and normal modes easily, whereby a user inexperienced in the operation of a mobile terminal can operate the mobile terminal further easily.

According to the above-described embodiment, the inter-mode movement operation between the simple and normal modes can be carried out easily, which makes it possible for a user inexperienced in the operation of a mobile terminal to operate the mobile terminal further easily.

What is claimed is:

1. A mobile terminal comprising:
    an application processor configured to activate each of a plurality of applications in one of a first mode and a second mode, wherein each of the first mode and the second mode includes two or more screens, corresponding to the plurality of applications, to display information and selectable functions for each of the plurality of applications that is activated, at least one of an amount of information displayed and a number of functions selectable on each of two or more first screens in the first mode is larger than that on each of a corresponding two or more second screens in the second mode, and each one of the two or more first screens in the first mode corresponds to one of the two or more second screens in the second mode;
    a mode selection unit configured to input a mode switching instruction; and
    a transition control unit configured to control the application processor to switch from activating one application in one of the first mode and the second mode to the other of the first mode and the second mode in accordance with the mode switching instruction input by the mode selection unit so that:
        a direct transition occurs between two of the two or more first screens in the first mode of the one application and the corresponding two of the two or more second screens in the second mode of the one application; or
        a direct transition occurs between two of the two or more second screens in the second mode of the one application and the corresponding two of the two or more first screens in the first mode of the one application.

2. The mobile terminal according to claim 1, further comprising a setting unit configured to set one of the first mode and the second mode as a basic mode, wherein the application processor activates each of the plurality of applications in said one of the first mode and the second mode set by the setting unit as the basic mode.

3. The mobile terminal according to claim 1, further comprising:
    a history memory configured to store an order in which applications were activated and respective corresponding modes in which the applications were activated, sequentially; and
    a management unit configured to activate the applications in a reverse order with respect to the order stored in the history memory.

4. The mobile terminal according to claim 1, wherein the application processor activates each of the plurality of applications in a basic mode in response to an interruption, and wherein one of the first mode and the second mode is set as the basic mode.

5. The mobile terminal according to claim 1, wherein each of the second screens in the second mode displays information on a larger scale than each of the corresponding first screens in the first mode.

6. The mobile terminal according to claim 1, wherein the two or more first screens, and the corresponding two or more second screens, are arranged with hierarchical levels.

7. The mobile terminal according to claim 6, wherein the two or more first screens, and the corresponding two or more second screens, include hierarchical menus.

8. A method of operating a mobile terminal including an application processor, a mode selection unit, and a transition control unit, the method comprising:
    activating, by the application processor, each of a plurality of applications in one of a first mode and a second mode, wherein each of the first mode and the second mode includes two or more screens, corresponding to the plurality of applications, to display information and selectable functions for each of the plurality of applications that is activated, at least one of an amount of information displayed and a number of functions selectable on each of two or more first screens in the first mode is larger than that on each of corresponding two or more second screens in the second mode, and each one of the two or more first screens in the first mode corresponds to one of the two or more second screens in the second mode;
    inputting, by the mode selection unit, a mode switching instruction; and
    switching, by the transition control unit, activation of one application in one of the first mode and the second mode to the other of the first mode and the second mode in accordance with the mode switching instruction input by the mode selection unit so that:
        a direct transition occurs between two of the two or more first screens in the first mode of the one application and the corresponding two of the two or more second screens in the second mode of the one application; or
        a direct transition occurs between two of the two or more second screens in the second mode of the one application and the corresponding two of the two or more first screens in the first mode of the one application.

9. The method according to claim 8, further comprising:
    setting one of the first mode and the second mode as a basic mode; and
    activating each of the plurality of applications in said one of the first mode and the second mode set as the basic mode.

10. The method according to claim 8, further comprising:
    storing an order in which applications were activated and respective corresponding modes in which the applications were activated, sequentially, in a history memory; and activating the applications in a reverse order with respect to the order stored in the history memory.

11. The method according to claim 8, further comprising: activating each of the plurality of applications in a basic mode in response to an interruption, wherein one of the first mode and the second mode is set as the basic mode.

12. The method according to claim 8, wherein each of the second screens in the second mode displays information on a larger scale than each of the corresponding first screens in the first mode.

13. The method according to claim 8, wherein the two or more first screens, and the corresponding two or more second screens, are arranged with hierarchical levels.

14. The method according to claim 13, wherein the two or more first screens, and the corresponding two or more second screens, include hierarchical menus.

15. A mobile terminal comprising:
- an application processor configured to activate each of a plurality of applications in one of a first mode and a second mode, wherein each of the first mode and the second mode includes a plurality of screens, corresponding to the plurality of applications, to display information and selectable functions for each of the plurality of applications that is activated, and at least one of an amount of information displayed and a number of functions selectable on each of first screens in the first mode is larger than that on each of corresponding second screens in the second mode;
- a mode selection unit configured to input a mode switching instruction; and
- a transition control unit configured to control the application processor to switch from activating one application in one of the first mode and the second mode to the other of the first mode and the second mode in accordance with the mode switching instruction input by the mode selection unit so that a direct transition occurs between one of the first screens in the first mode of the one application and a corresponding one of the second screens in the second mode of the one application, wherein the transition control unit controls the application processor to switch from activating a first application in one of the first and second modes to a second application different from the first application while continuing the one of the first and second modes in response to an application switch instruction.

16. A method of operating a mobile terminal including an application processor, a mode selection unit, and a transition control unit, the method comprising:
- activating, by the application processor, each of a plurality of applications in one of a first mode and a second mode, wherein each of the first mode and the second mode includes a plurality of screens, corresponding to the plurality of applications, to display information and selectable functions for each of the plurality of applications that is activated, and at least one of an amount of information displayed and a number of functions selectable on each of first screens in the first mode is larger than that on each of corresponding second screens in the second mode;
- inputting, by the mode selection unit, a mode switching instruction; and
- switching, by the transition control unit, activation of one application in one of the first mode and the second mode to the other of the first mode and the second mode in accordance with the mode switching instruction input by the mode selection unit so that a direct transition occurs between one of the first screens in the first mode of the one application and a corresponding one of the second screens in the second mode of the one application,
- wherein the switching controls the application processor to switch from activating a first application in one of the first and second modes to a second application different from the first application while continuing the one of the first and second modes in response to an application switch instruction.

\* \* \* \* \*